(12) United States Patent
Wesolkowski et al.

(10) Patent No.: US 6,411,737 B2
(45) Date of Patent: *Jun. 25, 2002

(54) METHOD OF SELECTING ONE OF A PLURALITY OF BINARIZATION PROGRAMS

(75) Inventors: Slawomir B. Wesolkowski, Kitchener; Khaled S. Hassanein, Waterloo, both of (CA)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 76 days.

(21) Appl. No.: 08/994,700

(22) Filed: Dec. 19, 1997

(51) Int. Cl.[7] .............................. G06K 9/36; G06T 1/40; G06T 9/00
(52) U.S. Cl. ........................ 382/237; 382/156; 382/172; 382/137
(58) Field of Search ................................. 382/237, 270, 382/272, 172, 171, 169, 137, 156; 358/462, 465, 466, 455, 456

(56) References Cited

U.S. PATENT DOCUMENTS

| | | | | |
|---|---|---|---|---|
| 4,251,837 A | * | 2/1981 | Janeway, III | 358/465 |
| 4,495,522 A | * | 1/1985 | Matsunawa et al. | 358/465 |
| 4,977,605 A | * | 12/1990 | Fardeau et al. | 382/172 |
| 4,996,602 A | | 2/1991 | Ono et al. | 358/455 |
| 5,075,872 A | * | 12/1991 | Kumagai | 382/172 |
| 5,187,592 A | * | 2/1993 | Sugiyama et al. | 358/426 |
| 5,633,954 A | * | 5/1997 | Gupta et al. | 382/187 |
| 5,889,885 A | * | 3/1999 | Moed et al. | 382/172 |

* cited by examiner

Primary Examiner—Scott Rogers
(74) Attorney, Agent, or Firm—Michael Chan

(57) ABSTRACT

A document processing apparatus comprises a scanner for scanning a bank check to obtain gray scale image data associated with the bank check. A processor is provided for (i) selecting one of a plurality of binarization programs based upon the gray scale image data, and (ii) applying the binarization program selected to at least a portion of the gray scale image data to provide a binary image of at least a portion of the bank check.

20 Claims, 5 Drawing Sheets

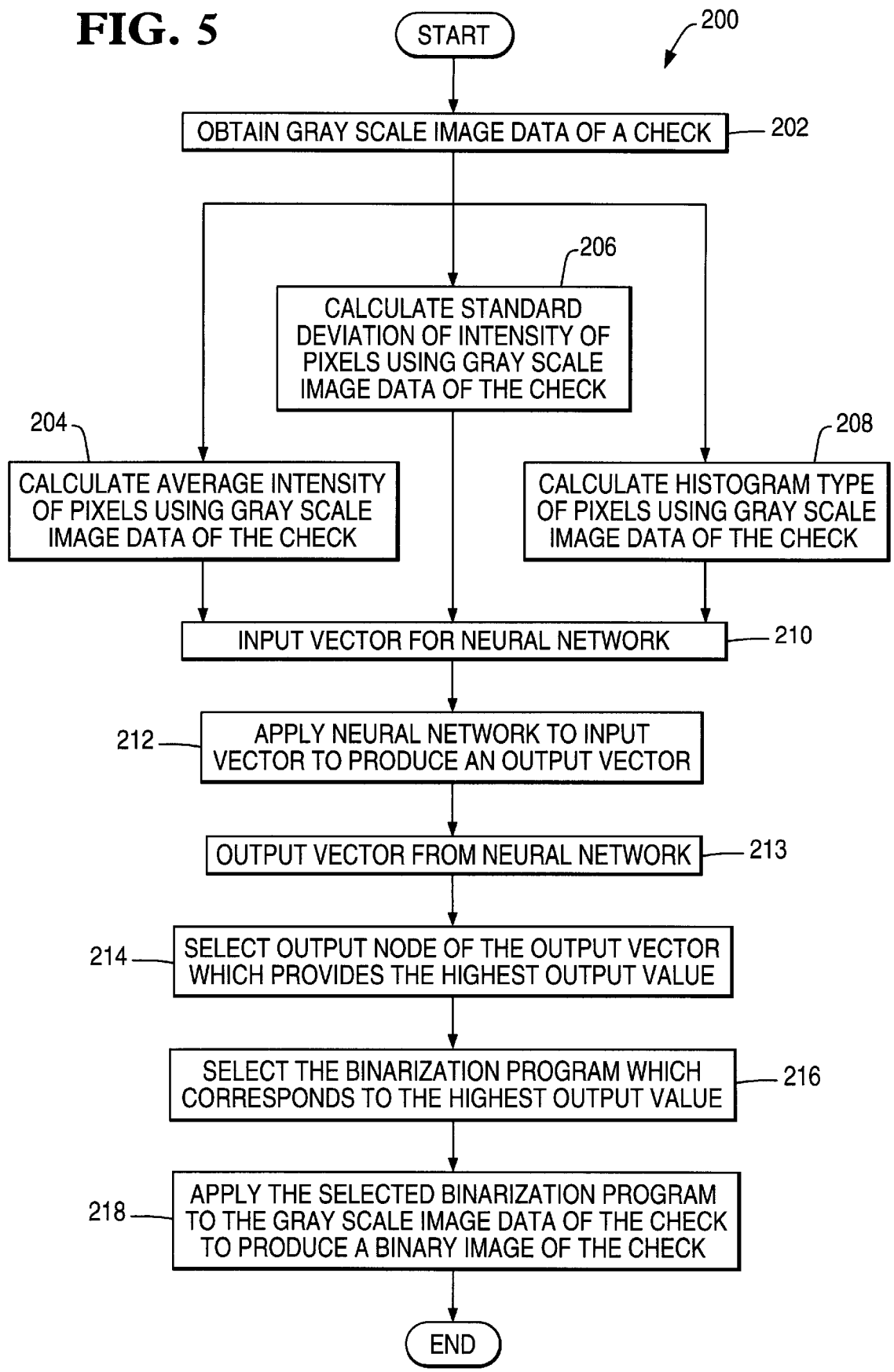

METHOD OF SELECTING ONE OF A PLURALITY OF BINARIZATION PROGRAMS

BACKGROUND OF THE INVENTION

The present invention relates to binarization programs, and is particularly directed to a method of selecting a binarization program based upon image data which has been obtained from scanning a document such as a bank check.

In known check processing applications in which gray scale image data is obtained from scanning a bank check, two or more binarization programs may be applied to the same gray scale image data to extract a corresponding number of binary images of the check. The extracted binary images are then compared to identify the binary image of the best image quality. A disadvantage in applying two or more binarization programs to gray scale image data to extract a corresponding number of binary images of the check is that computational costs are relatively high.

SUMMARY OF THE INVENTION

In accordance with one aspect of the present invention, a document processing apparatus comprises a scanner for scanning a bank check to obtain gray scale image data associated with the bank check. A processor is provided for (i) selecting one of a plurality of binarization programs based upon the gray scale image data, and (ii) applying the binarization program selected to at least a portion of the gray scale image data to provide a binary image of at least a portion of the bank check.

Preferably, the processor includes a neural network which is applied to at least one value which has been calculated based upon the gray scale image data. The neural network may accept as input a value indicative of average intensity of pixels associated with the check. The neural network may also accept as input a value indicative of standard deviation of pixels associated with the check. The neural network may also accept as input a value indicative of histogram type of pixels associated with the check.

In accordance with another aspect of the present invention, a method of processing a bank check comprises the steps of (a) scanning the bank check to obtain gray scale image data associated with the bank check, (b) selecting one of a plurality of binarization programs based upon the gray scale image data obtained in step (a), and (c) applying the binarization program selected in step (b) to at least a portion of the gray scale image data obtained in step (a) to provide a binary image of at least a portion of the bank check.

Preferably, step (b) includes the step of (b-1) applying a neural network to at least one value which has been calculated based upon the gray scale image data obtained in step (a). Step (b-1) may include the step of accepting as input a value indicative of an average intensity of pixels associated with the check, accepting as input a value indicative of standard deviation of intensity of pixels associated with the check, or accepting as input a value indicative of histogram type of pixels associated with the check.

BRIEF DESCRIPTION OD THE DRAWINGS

The foregoing and other features of the present invention will become apparent to one skilled in the art to which the present invention relates upon consideration of the following description of the invention with reference to the accompanying drawings, wherein:

FIG. 5 is a flowchart depicting a process carried out by the system of FIG. 1 to select a binarization program using a neural network which has been trained in accordance with the processes depicted in FIGS. 3 and 4.

DETAILS OF THE INVENTION

The present invention is directed to a method of selecting a binarization program based upon image data obtained from scanning a document. The document may be of any type. By way of example, a document in the form of a bank check is processed in accordance with the present invention.

Figure 1:
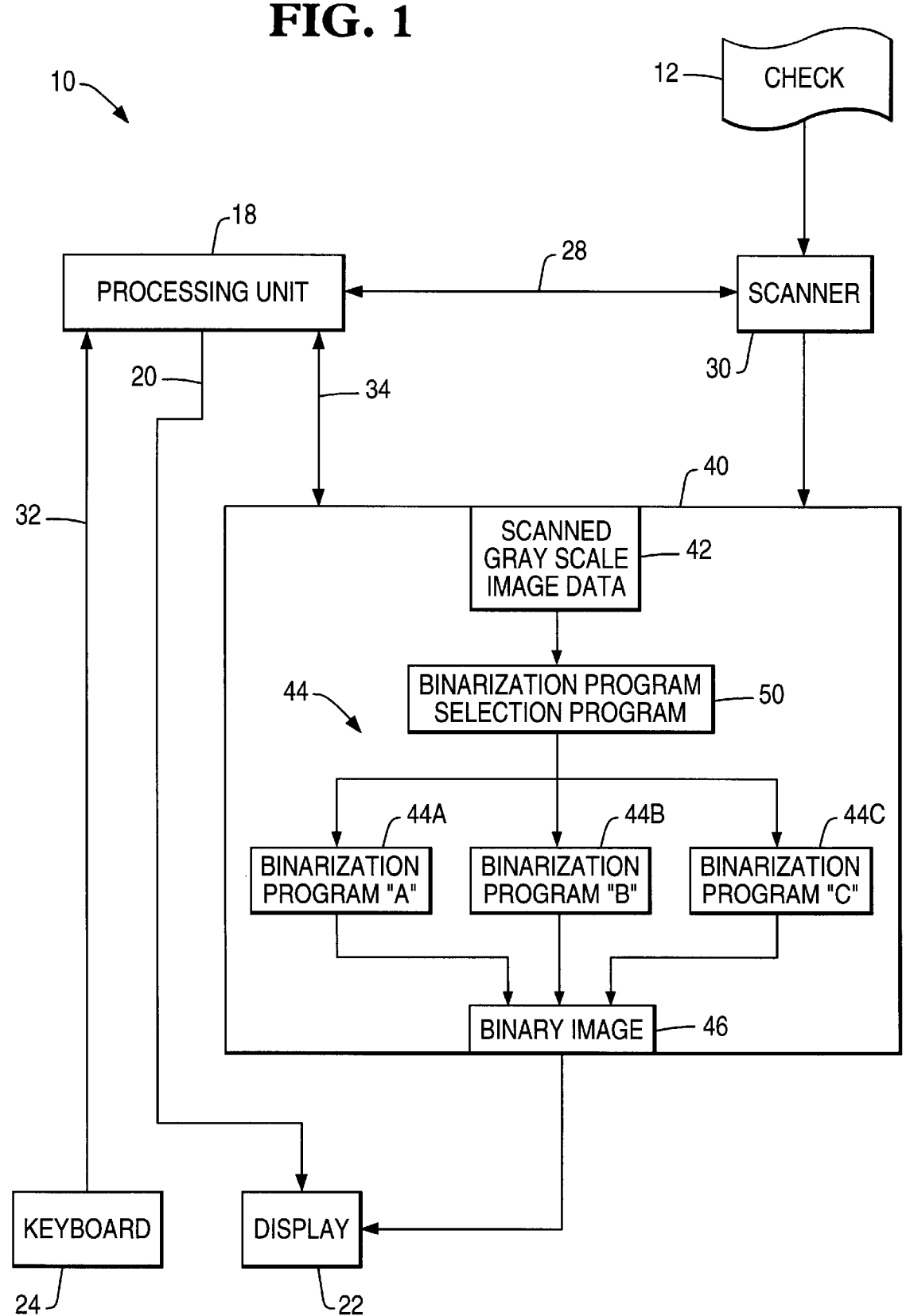
FIG. 1 is a block diagram representation of a document processing system embodying the present invention.

Referring to FIG. 1, a check processing system 10 includes a processing unit 18 which is electrically connected via bus line 20 to a display 22. The processing unit 18 is also electrically connected via bus line 32 to a keyboard 24 and via bus line 34 to a system memory 40. The system memory 40 includes memory space which stores, inter alia, scanned gray scale image data, a number of application programs, and binary image data. The scanned gray scale image data is obtained from scanning a check.

The application programs stored in the system memory 40 include a plurality of known binarization programs 44A, 44B, 44C. Although only the three binarization programs 44A, 44B, 44C are shown in FIG. 1, it is contemplated that either only two or more than three binarization programs may be used. Many different binarization programs are known and, therefore, will not be described herein. The application programs stored in the system memory 40 further include a binarization program selection program 50 in accordance with the present invention which will be described in detail later.

The check processing system 10 further includes a scanner device 30 which is electrically connected via bus line 28 to the processing unit 18. Preferably, the processing unit 18 is a microcomputer, and the system memory 40 is a random access type of memory. Suitable microcomputers and memories are readily available in the marketplace. Their structure and operation are well known and, therefore, will not be described.

Figure 2:
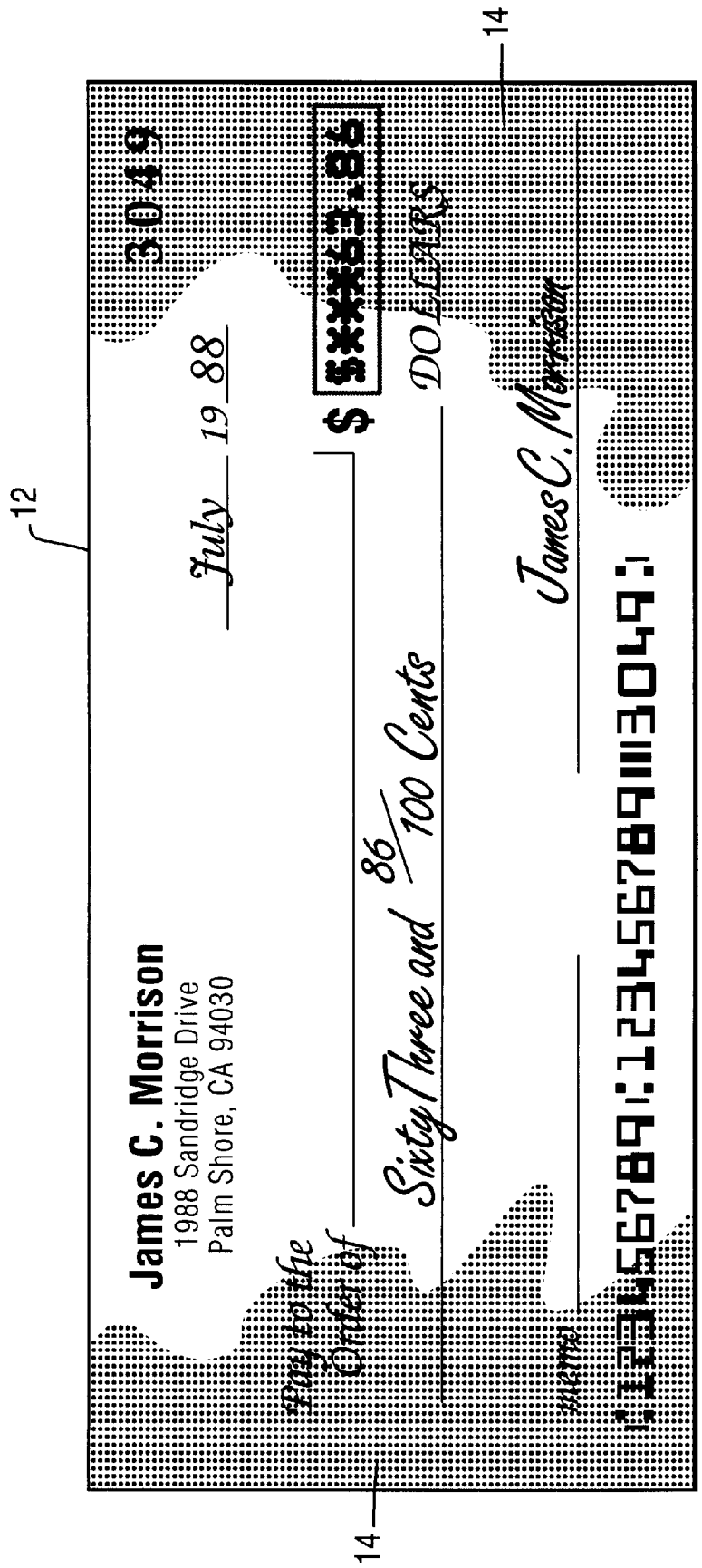
FIG. 2 is a diagram of a check having a courtesy amount field.

During operation, the scanner device 30 lifts an image of a bank check 12 (see also FIG. 2) when the check is moved past the scanner device. The check 12 has a greyish background 14 as shown in FIG. 2. A middle portion of the greyish background 14 of the check 12 in FIG. 2 is removed to more clearly show certain information on the check. For the purpose of describing the present invention, it is assumed that the scanner device 30 lifts an image of the entire check 12.

The scanner device 30 produces pixels each pixel having a particular gray level associated therewith. The gray level of the pixel is stored as gray scale image data 42 in the system memory 40 as shown in FIG. 1. The gray scale image data 42 associated with all the pixels form a gray scale image (not shown) of the check 12. The process of lifting an image of the check 12 and storing the image as gray scale image data 42 in system memory 40 is known and, therefore, will not be described.

After the check 12 is stored as gray scale image data 42 in the system memory 40, the binarization program selection program 50 selects one of the three binarization programs 44A, 44B, 44C in accordance with the present invention which is described hereinbelow. The selected one of the binarization programs 44A, 44B, 44C then binarizes the gray scale image data 42 corresponding to the check 12 to provide a corresponding binary image 46 of the check as shown in FIG. 1. The corresponding binary image 46 of the check 12 is displayed on the display 22.

Figure 4:
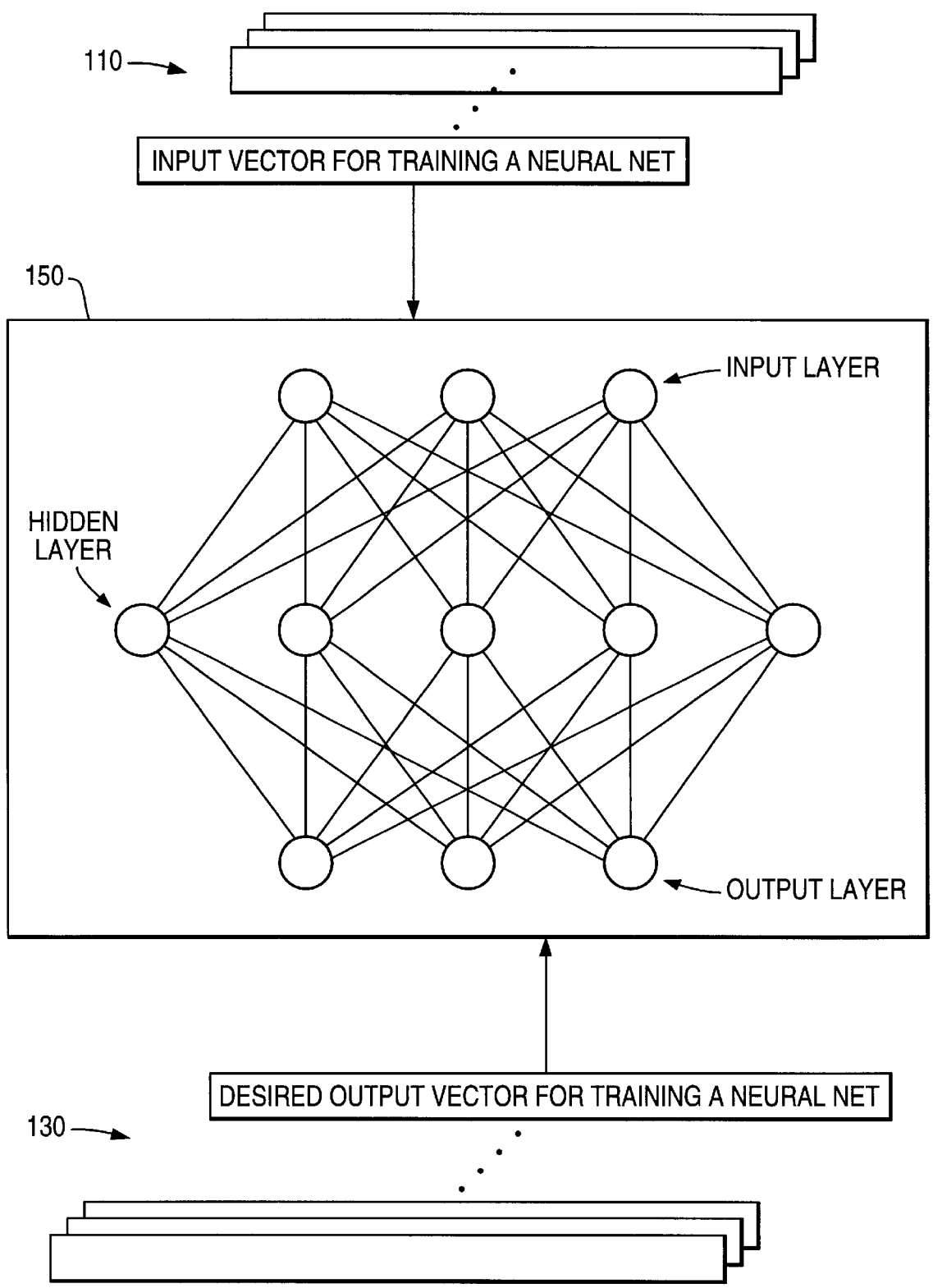

In accordance with the present invention, the binarization program selection program 50 applies a neural network 150 (as shown in FIG. 4) to at least a portion of the gray scale image data 42 associated with the particular check being processed to select one of the binarization programs 44A, 44B, 44C to binarize the gray scale image data corresponding to the check being processed to provide the binary image of the check being processed. The structure, operation, and training of neural networks in general are known and, therefore, will not be described. The neural network 150 as shown in FIG. 4 may be trained using a back propagation algorithm, as is known, for example.

Figure 3:
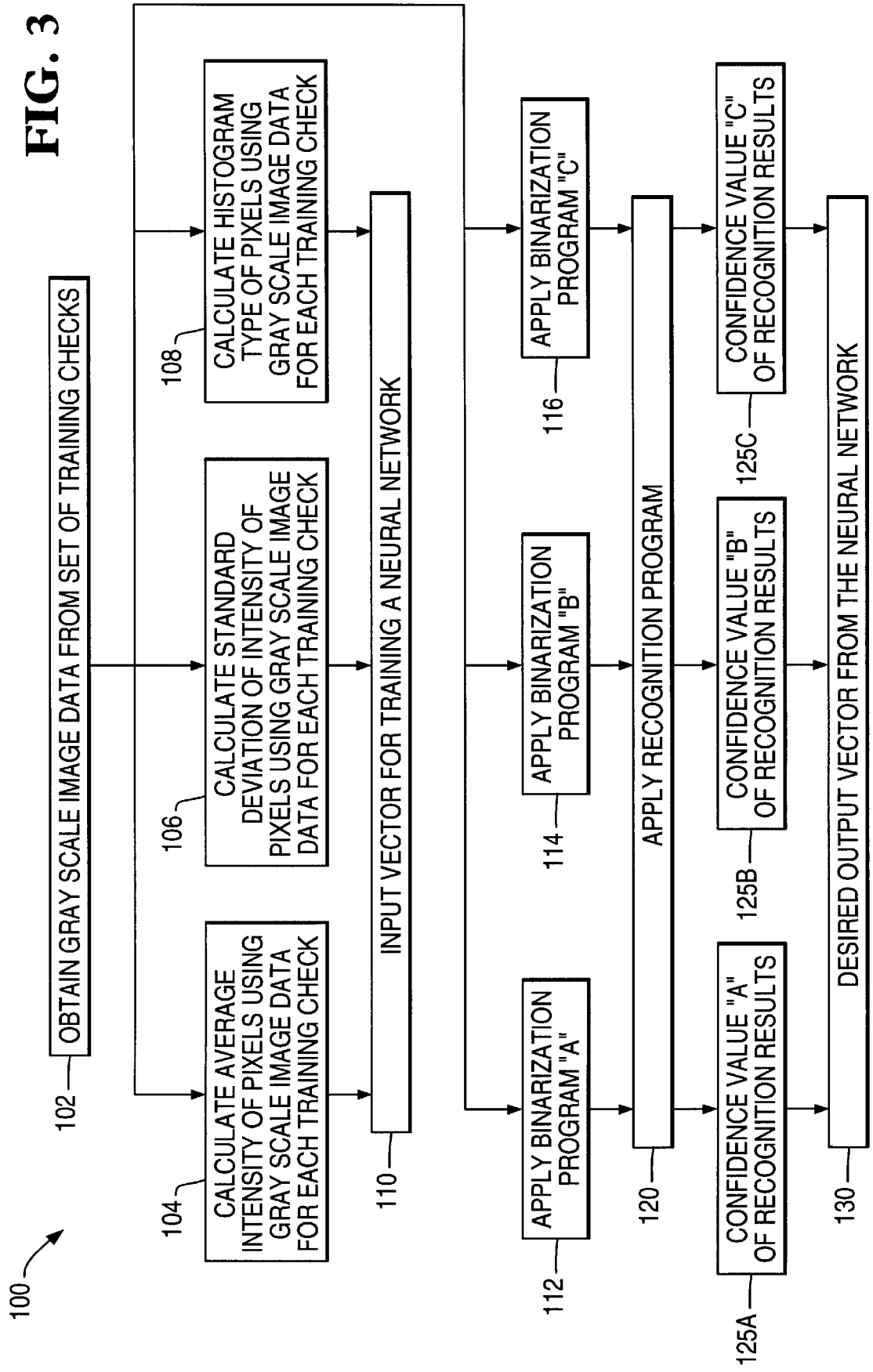
FIGS. 3 and 4 are diagrams depicting steps carried out by the system of FIG. 1 to train a neural network in accordance with the present invention.

Referring to FIG. 3, a flow diagram 100 depicts a process for creating the training data for the neural network 150 in accordance with the present invention. In step 102 of the process, a set of training checks is scanned to obtain gray scale image data associated with each training check. For each training check, three values associated with pixels in the corresponding gray scale image data of the particular check are calculated as shown in steps 104, 106, and 108. In step 104, an average intensity of pixels is calculated for each training check based upon the corresponding gray scale image data for that training check. In step 106, a standard deviation of intensity of pixels is calculated for each training check based upon the corresponding gray scale image data for that training check. In step 106, a histogram type of pixel values (e.g., unimodal, bimodal, or multimodal) is calculated for each training check based upon the corresponding gray scale image data for that training check. The three calculated values from steps 104, 106, and 108 form one of a number of input vectors (designated as block 10 in FIG. 3) for training the neural network 150.

The gray scale image data obtained in step 102 for each training check is also processed by each of the binarization programs 44A, 44B, 44C, as shown in steps 112, 114, and 116. The binarized results from each of the binarization programs 44A, 44B, 44C are then processed by a recognition program as shown in step 120. The recognition program may be any type of recognition engine such as a character recognition engine provided by CAERE Corporation located in Los Gatos, Calif. The recognition program produces recognition results including confidence values which correspond one-to-one with the binarization programs 44A, 44B, 44C. As shown in FIG. 3, confidence values "A", "B", and "C" in blocks 125A, 125B, and 125C are produced and correspond to binarization programs 44A, 44B, and 44C, respectively. The confidence values "A", "B", and "C" form one of a number of output vectors (designated as block 130 in FIG. 3) which is desired of the neural network 150 being trained. Each of the output vectors 130 is formed in response to a corresponding one of the input vectors 110 for the particular check being processed.

Referring now to FIG. 4, each of the input vectors 110 and each of the desired output vectors 130 in FIG. 3 are applied to the known neural network 150 to train the neural network in a known manner. As shown in FIG. 4, the neural network 150 includes an input layer having three nodes which receive the input vectors 110 and an output layer having three nodes which receive the desired output vectors 130. The neural network 150 further includes a hidden layer having five nodes, for example, in which each node interconnects each node of the input layer and each node of the output layer. Neural networks and the training thereof are known and, therefore, will not be described.

Referring to FIG. 5, a flowchart 200 depicts processes carried out by the binarization program selection program 50 in accordance with the present invention when the check 12 is being processed. In step 202, gray scale image data is obtained from the check 12 being processed and is stored in the system memory 40. For each check being processed, three values associated with pixels in the corresponding gray scale image data of the particular check are calculated as shown in steps 204, 206, and 208. In step 204, an average intensity of pixels is calculated for each check being processed based upon the corresponding gray scale image data for that check. In step 206, a standard deviation of intensity of pixels is calculated for each check being processed based upon the corresponding gray scale image data for that check. In step 208, a histogram type of pixels is calculated for each check being processed based upon the corresponding gray scale image data for that check. The three calculated values from steps 204, 206, and 208 form one of a number of input vectors (designated as block 210 in FIG. 5) to be processed by the neural network 150 which has been trained in accordance with the steps described hereinabove with specific reference to FIGS. 3 and 4.

As shown in step 212, the trained neural network 150 is applied to each of the input vectors 210 to produce a corresponding one of a number of output vectors (designated as block 213 in FIG. 5). The process then proceeds to step 214 in which the output node of one of the output vectors from step 212 which produces the highest output value (i.e., confidence value) is selected. Then, in step 216, the one of the three binarization programs 44A, 44B, 44C which corresponds to the highest output value from step 214 is selected. In step 218, the selected binarization program from step 216 is applied to the gray scale image data 42 stored in the system memory 40 and corresponding with the check being processed to produce a binary image of the check being processed.

A number of advantages result by selecting only one of a plurality of binarization programs based upon gray scale image data in accordance with the present invention. One advantage is that computational costs are minimized. Computation costs are minimized because only one and not all of the binarization programs are applied to the gray scale image data associated with the check being processed to produce a corresponding binary image of the check. Another advantage is that the one binarization program which has been selected is the one which provides the binary image having the best image quality.

Although the neural network described hereinabove accepts as inputs only three values (average intensity of pixel values, standard deviation of intensity of pixel values, and the histogram type of pixel values) associated with pixels of each check being processed, it is contemplated that other types values be accepted as inputs. For examples, a median intensity of pixel values, an average value of background pixels, an average value of foreground pixels, and estimates of local and global stroke widths may be accepted as inputs.

From the above description of the invention, those skilled in the art to which the present invention relates will perceive improvements, changes and modifications. Numerous substitutions and modifications can be undertaken without departing from the true spirit and scope of the invention.

Such improvements, changes and modifications within the skill of the art to which the present invention relates are intended to be covered by the appended claims.

What is claimed is:

1. A document processing apparatus comprising:
    a scanner for scanning a bank check to obtain gray scale image data associated with the bank check;
    a memory for storing a plurality of different selectable binarization programs, each of the plurality of different selectable binarization programs having a non-selectable threshold associated therewith; and
    a processor for (i) selecting one of the plurality of different selectable binarization programs based upon the gray scale image data associated with the bank check, and (ii) then applying the selected binarization program to at least a portion of the gray scale image data to provide a binary image of at least a portion of the bank check.

2. A document processing apparatus according to claim 1, wherein the processor includes a neural network which is applied to at least one value which has been calculated based upon the gray scale image data.

3. A document processing apparatus according to claim 2, wherein the neural network accepts as input a value indicative of average intensity of pixels associated with the check.

4. A document processing apparatus according to claim 2, wherein the neural network accepts as input a value indicative of standard deviation of pixels associated with the check.

5. A document processing apparatus according to claim 2, wherein the neural network accepts as input a value indicative of standard deviation of pixels associated with the check.

6. A method of processing a bank check, the method comprising the steps of:
    (a) scanning the bank check to obtain gray scale image data associated with the bank check;
    (b) selecting one of a plurality of different selectable binarization programs having non-selectable thresholds based upon the gray scale image data obtained in step (a); and
    (c) applying the binarization program selected in step (b) to at least a portion of the gray scale image data obtained in step (a) to provide a binary image of at least a portion of the bank check.

7. A method according to claim 6, wherein step (b) includes the step of:
    (b-1) applying a neural network to at least one value which has been calculated based upon the gray scale image data obtained in step (a).

8. A method according to claim 7, wherein step (b-1) includes the step of:
    (b-1) accepting as input a value indicative of an average intensity of pixels associated with the check.

9. A method according to claim 7, wherein step (b-1) includes the step of:
    (b-1-1) accepting as input a value indicative of standard deviation of intensity of pixels associated with the check.

10. A method according to claim 7, wherein step (b-1) includes the step of:
    (b-1-1) accepting as input a value indicative of histogram type of pixels associated with the check.

11. A document processing apparatus comprising:
    a scanner for scanning a bank check to obtain gray scale image data associated with the bank check;
    a memory for storing a plurality of different selectable binarization programs, each of the plurality of different selectable binarization programs having a single predetermined threshold associated therewith and
    a processor for (i) selecting one of the plurality of different selectable binarization programs based upon the gray scale image data associated with the bank check, and (ii) then applying the selected binarization program to at least a portion of the gray scale image data to provide a binary image of at least a portion of the bank check.

12. A document processing apparatus according to claim 11, wherein the processor includes a neural network which is applied to at least one value which has been calculated based upon the gray scale image data.

13. A document processing apparatus according to claim 12, wherein the neural network accepts as input a value indicative of average intensity of pixels associated with the check.

14. A document processing apparatus according to claim 12, wherein the neural network accepts as input a value indicative of standard deviation of pixels associated with the check.

15. A document processing apparatus according to claim 12, wherein the neural network accepts as input a value indicative of histogram type of pixels associated with the check.

16. A method of processing a bank check, the method comprising the steps of:
    (a) scanning the bank check to obtain gray scale image data associated with the bank check;
    (b) selecting one of a plurality of different selectable binarization programs having fixed predetermined thresholds based upon the gray scale image data obtained in step (a); and
    (c) applying the binarization program selected in step (b) to at least a portion of the gray scale image data obtained in step (a) to provide a binary image of at least a portion of the bank check.

17. A method according to claim 16, wherein step (b) includes the step of:
    (b-1) applying a neural network to at least one value which has been calculated based upon the gray scale image data obtained in step (a).

18. A method according to claim 17, wherein step (b-1) includes the step of:
    (b-1-1) accepting as input a value indicative of an average intensit y of pixels associated with the check.

19. A method according to claim 17, wherein step (b-1) includes the step of:
    (b-1-1) accepting as input a value indicative of standard deviation of intensity of pixels associated with the check.

20. A method according to claim 17, w herein step (b-1-1) includes the step of:
    (b-1-1) accepting as input a value indicative of histogram type of pixels associated with the check.

* * * * *

UNITED STATES PATENT AND TRADEMARK OFFICE
CERTIFICATE OF CORRECTION

PATENT NO. : 6,411,737 B2
DATED : June 25, 2002
INVENTOR(S) : Slawomir B. Wesolkowski It is certified that error appears in the above-identified patent and that said Letters Patent is hereby corrected as shown below:

Column 5,
Line 32, delete "standard deviation" and insert -- histogram type --.
Line 53, delete "(b-1)" and insert -- (b-1-1) --.

Signed and Sealed this

Twenty-second Day of October, 2002

Attest:

Attesting Officer

JAMES E. ROGAN
Director of the United States Patent and Trademark Office